United States Patent [19]
Markowski

[11] 3,747,345
[45] July 24, 1973

[54] SHORTENED AFTERBURNER CONSTRUCTION FOR TURBINE ENGINE

[75] Inventor: Stanley J. Markowski, East Hartford, Conn.

[73] Assignee: United Aircraft Corporation, East Hartford, Conn.

[22] Filed: July 24, 1972

[21] Appl. No.: 274,784

Related U.S. Application Data

[62] Division of Ser. No. 84,087, Oct. 26, 1970.

[52] U.S. Cl.................. 60/261, 60/39.72 R, 60/262
[51] Int. Cl............................................. F02k 3/10
[58] Field of Search............... 60/261, 262, 39.72 R

[56] References Cited
UNITED STATES PATENTS

| | | | |
|---|---|---|---|
| 3,373,562 | 3/1968 | Wormser | 60/262 |
| 3,540,216 | 11/1970 | Quillevere | 60/261 |
| 3,595,024 | 7/1971 | Bader | 60/262 |
| 3,633,362 | 1/1972 | Sotheran | 60/261 |

*Primary Examiner*—Douglas Hart
*Attorney*—Vernon F. Hauschild

[57] ABSTRACT

An afterburner construction for a turbine engine, such as a turbofan engine, which is foreshortened by using a construction which utilizes swirl flow phenomena to rapidly mix the engine products of combustion and coolant flow, such as fan air, and/or to rapidly accomplish the afterburning combustion process in the afterburner, while maintaining engine performance and structural part integrity.

20 Claims, 20 Drawing Figures

SHORTENED AFTERBURNER CONSTRUCTION FOR TURBINE ENGINE

CROSS-REFERENCES TO RELATED APPLICATIONS

This is a division of application Ser. No. 84,087, filed Oct. 26, 1970.

This application contains subject matter related to the following two applications assigned to the same assignee: (1) application Ser. No. 874,086, for "Annular Combustion Chamber for Dissimilar Fluids in Swirling Flow Relationship" and (2) application Ser. No. 84,088, for "Combuston Chamber Having Swirling Flow" now Pat. No. 3,675,419, issued July 11, 1972.

BACKGROUND OF THE INVENTION

1. Field of Invention

This invention relates to afterburner construction and more particularly to the constuction for an afterburner which is intended for use with a turbojet engine, possibly a turbofan engine, so as to shorten the axial length of the afterburner, thereby reducing engine length and wieght.

2. Description of the Prior Art

In the prior art, attempts have been made to more rapidly mix the products of engine combustion and the turbofan air upon entering an afterburner, such as Howald Pat. No. 3,048,376 and Pierce Pat. No. 2,978,865; however, these patents provided tortuous, narrow passages through which the exhaust gas and the fan air must pass and this created substantial losses in the system with attendant engine thrust reduction.

Other patents, such as Ferri et al. Pat. No. 2,755,623, have suggested the use of circumferentially rotating flow in combustion chambers to permit the accomplishment of combustion in a shorter axial distance, however, they do not suggest the use of swirling flow principles to accelerate the mixing between two thermodynamically and aerodynamically dissimilar fluids.

In my invention, swirling fluid flow principles are used in a vane cascade in the afterburner to serve the function of accelerating the mixing and combustion in the combustion zone of the afterburner and also the function of straightening flow prior to discharge of the exhaust nozzle. These afterburner vanes have cooling provisions and may be used with many forms of fuel injection and fuel ignition systems.

SUMMARY OF THE INVENTION

A primary object of the present invention is to provide an afterburner of minimal axial dimension or length.

It is an important feature of this invention to reduce the length of an afterburner by passing swirling air therethrough and between at least one cascade of selectively contoured vanes which are positioned circumferentially about the afterburner chamber and which serve as combustors when fuel is injected into the air at a station upstream thereof to form a fuel-air mixture which is ignited with flameholder support at the side of the vane defined passage having the greater radius of curvature to thereby perform the afterburning function and the flow straightening function in the combustors defined between the vanes.

A further feature of this construction is that numerous fuel injection mechanisms, flameholder mechanisms and interface disturbing trigger mechanisms can be used therewith and the construction includes provisions for keeping the vane walls cool.

It is a further object of the present invention to teach apparatus to shorten the length of an afterburner utilizing swirl flow by placing a cascade of flow straightening vanes about the periphery of the afterburner and positioning aerodynamic flameholders immediately upstream or at the leading edge thereof and interdigitated with respect thereto to establish a pilot combustion zone for the fuel-air mixture being passed through the vane cascade for curved flow combustion within the cascade.

It is a further object of this invention to teach apparatus for shortening an afterburner by utilizing circumferentially positioned and radially directed vanes to form a vane cascade, in combination with flameholder and fuel injection mechanism to define pilot combustors between the vanes, and wherein the vanes are hollow and include provisions for cooling the vane wall, in particular the substantially downstream directed concave vane wall in installations where structural part cooling is necessary.

It is a further teaching of this invention to utilize either a concentric mixer or a barberpole mixer upstream of my cascade flameholder in an annular combustion chamber. While the cascade flameholder can be used in a turboject engine, in a duct heater engine, and in turbofan engines, it is particularly attractive when used with a mixed turbofan cycle engine because a concentric or barberpole mixer can be utilized forward of the cascade flameholder to mix the fan and engine streams and provide this mixture to the cascade in the proper swirl flow relationship, so that accelerated mixing and combustion will take place within the cascade simultaneously with the cascade performing the function of straightening the direction of fluid flow to an axial direction.

In accordance with one of the features of the present invention, the engine exhaust gas and the turbofan air entering the afterburner are controlled by means of guide vanes or the like so that as they enter the afterburner through a concentric mixer, the product parameter $\rho_1 V_{t1}^2$ of the engine exhaust gases is greater than the product parameter $\rho_2 V_{t2}^2$ of the fan air where $\rho$ is density and $V_t$ is tangential velocity, and further wherein trigger means are provided to physically disturb the interface between the swirling streams of engine exhaust gas and fan air entering the afterburner, and still further wherein the afterburner may include a variable area exhaust nozzle at the downstream end thereof and flow straightening vanes upstream of the exhaust nozzle, and still further wherein said trigger means may be circumferentially oriented and radially extending corrugations or convolutions and/or axially extending scallops attached to the downstream end of the splitter duct between the engine exhaust gases and the fan air.

In accordance with still a further feature of the present invention, the fan air and the engine exhaust gas of a turbofan engine are mixed rapidly before or upon entering the afterburner in a construction which utilizes a plurality of circumferentially positioned and helically oriented three-dimensional scoop cascades which intercept and deliver fan air through a plurality of circumferentially positioned and helically oriented matching slots in a splitter duct extending across the fan air stream, and wherein the area of the duct system through which the engine exhaust gases enter the afterburner has a selected relationship to the total slot area so as to control the fan air velocity magnitude entering the afterburner chamber and so that the scoop and slot shape establishes a plurality of circumferentially oriented and selectively spaced helical sheets of fan air penetrating and mixing with the swirling engine products of combustion in a minimal axial distance and with minimal mixing losses.

DESCRIPTION OF THE PREFERRED EMBODIMENT

Figure 1:
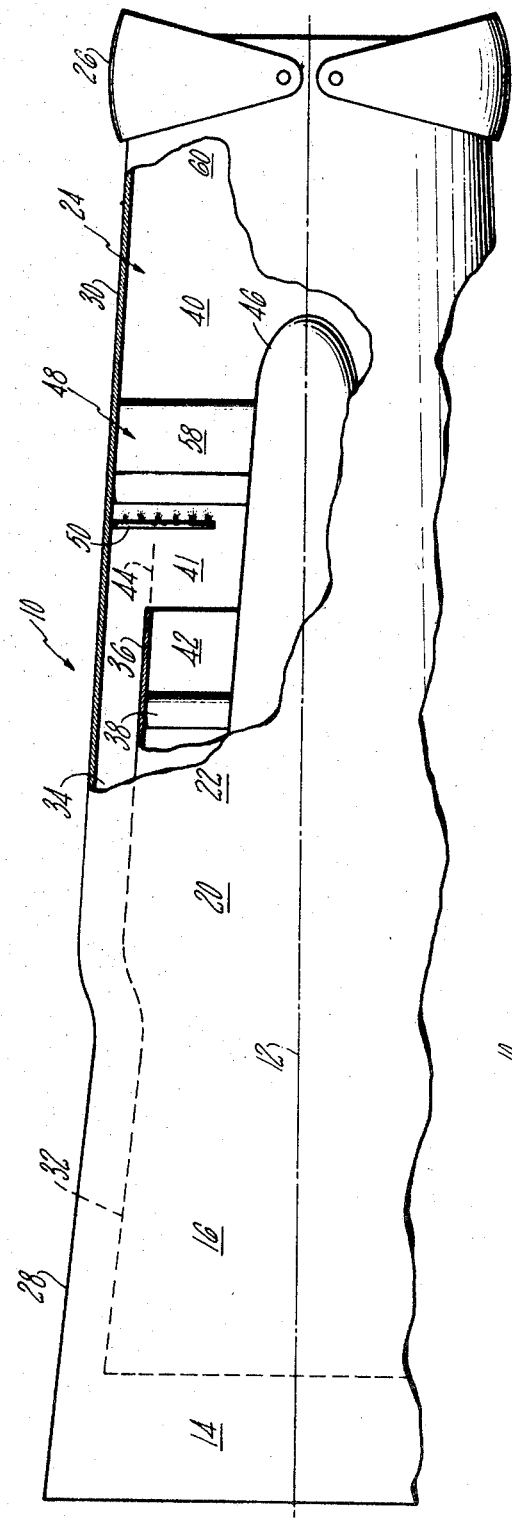
FIG. 1 is a showing of a turbofan engine with the afterburner thereof partially broken away to illustrate the general environment and location of my invention.

Referring to FIG. 1 we see turbine engine 10, which is shown to be of the turbofan variety purely for the purpose of illustration but it should be noted that the invention disclosed herein would have application to any engine in which engine exhaust gas were discharged into an afterburner, preferably in combination with coolant gas. Engine 10 is generally of circular cross-section and concentric about axis 12 and includes fan section 14, compressor section 16, burner section 20, and turbine section 22, and afterburner section 24. Variable area exhaust nozzle 26 is preferably located at the downstream end of the afterburner to vary outlet area in conventional fashion. Fan duct 28 is of circular cross-section and positioned concentrically about axis 12 and connects to afterburner duct 30 so as to conduct the fan air directly into the afterburner. Engine casing 32 is positioned concentrically within fan duct 28 and cooperates therewith to define annular fan air passage 34 and envelopes the engine compressor section 16, burner section 20 and turbine section 22 and culminates in or attaches to splitter duct 36, which envelopes the last stage 38 of turbine section 22 and projects into or toward the afterburner chamber 40 formed within afterburner duct 30. Fan air duct 28 and splitter duct or engine exhaust duct 36 form concentric mixer 41. Fan air after passing through annular passage 34 flows radially outwardly of splitter duct 36 and engine exhaust gas flowing through passage 42, defined within splitter duct 36, flows radially inwardly of splitter duct 36, and since both of these fluids will be flowing in swirling fashion either due to the action of the engine including turbine stage 38 and the action of the blades of the fan section 14, or additional flow directing vanes utilized therewith, an interface 44 will be established between these two swirling fluid streams downstream of splitter duct 36. To establish the desired swirling flow, it may be desirable to remove or adjust the conventional flow straightening vanes downstream of the turbine and the fan.

In the afterburner section 24, fixed inner body 46 is positioned concentrically within afterburner duct 30 and vane cascade 48, whose construction and function will be described in greater particularity hereinafter, extends between afterburner duct 30 and fixed inner body 46. Fuel injection means 50 injects fuel upstream or forward of vane cascade 48 into the fan air exhaust gas mixture to form a fuel-gas mixture therewith. Ignitor means (not shown) of conventional design would be used to initiate combustion in combustion zone 58.

In operation, the products of combustion enter the afterburner through passage 42 and intermix with the fan air which enters the afterburner through passage 34. Fuel is injected by injector 50 and combustion takes place in the combustion zone 58 and 40 and the products of combustion thereof, in a vitiated state, are then discharged to atmosphere through variable area exhaust nozzle 26 to perform a thrust generating function.

It is an important feature of my invention to shorten the afterburner combustion zone porper by utilizing a cascade flameholder of the constructions shown in FIGS. 2–13, and this cascade flameholder may be used with or independently of the mixer configurations shown in FIGS. 14–20 if the engine is a turbofan cycle.

Figure 2:
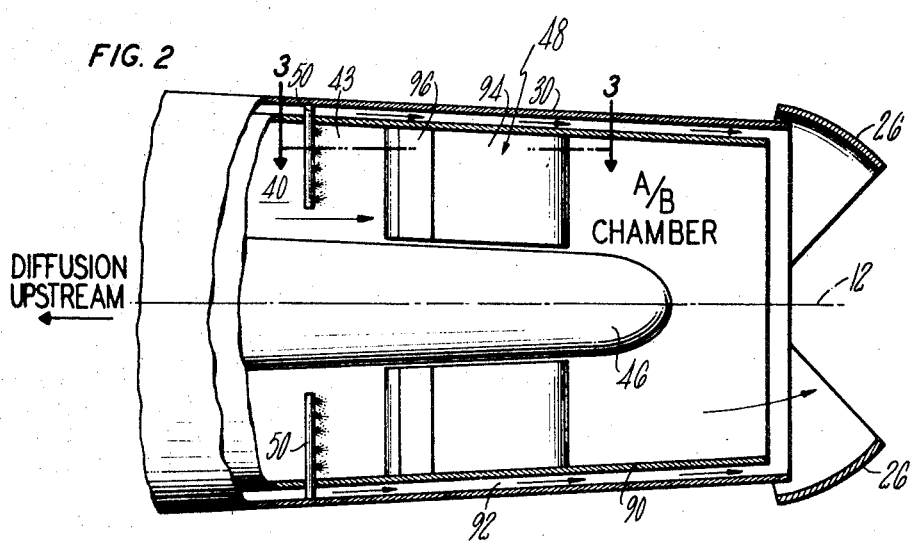
FIG. 2 is a showing of the combustion chamber area of an afterburner utilizing a vane cascade flameholder to define the combustion chamber.
Figure 3:
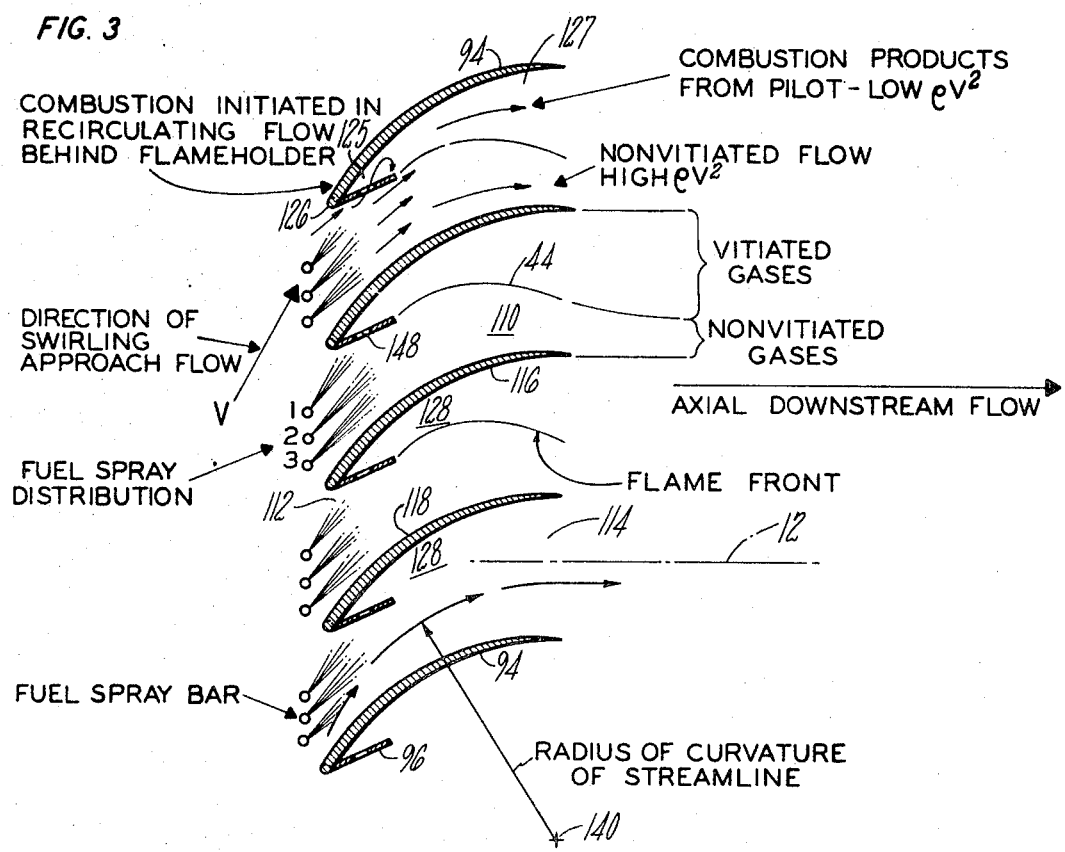
FIG. 3 is a showing along line 3—3 of FIG. 2 of my cascade flameholder in which the vanes of the cascade establishes combustion chambers therebetween and serve flow straightening devices, and in which the flameholder is a pivotable door attached to the leading edge of the turning vanes.

Referring to FIGS. 2 and 3 we see afterburner chamber 40 defined within afterburner duct 30 and with variable area exhaust nozzle 26 at the downstream end thereof. If required, afterburner duct will include a cooling liner 90 of cylindrical shape and concentric about axis 12 which defines a cooling air annular passage 92 with duct 30. Cooling liner 90 performs the function of distributing the available cooling air selectively over the entire length of the afterburner and uses conventional means, such as louvers or transpiration cooling, to perform this function. Vane cascade flameholder 48 consists of a plurality of radially extending and circumferentially oriented vanes 94 with flameholder member 96 utilized therewith. As previously described, fuel injection mechanism 50 are shown as radial spray bars in FIGS. 2 and 3 and inject atomized fuel into combustion chamber 40 to be carried with the swirling gas through the vane cascade flameholder 48 for mixing and combusting therewithin. The vane cascade and the flameholders 96 preferably extend radially across annular passage 43 defined between inner body 46 and the afterburner outer case 30 or liner 90 and constitute a circumferential row or cascade of vanes. These vanes are shown in greater particularity in FIG. 3 wherein it will be noted that adjacent vanes 94 define passage 110 therebetween and the vanes are so shaped that the inlet or upstream portion 112 of passage 110 opens in the direction of the swirling approach flow V, while the downstream portion 114 of passage 110 extends in the direction of axis 12 so that vanes 94 serve as straightening vanes as well as forming combustors therebetween as soon to be described. Passage 110 is defined between concave wall 116 of one of the vanes 94 and convex wall 118 of the adjacent vane 94 so that these walls become the walls of passage 110. It will be noted that flameholder mechanism 96 is a extending plate member which preferably extends for the full radial dimension of vanes 94 and is pivotally attached to vane 94 at its leading edge at pivot station 126 so that by any convenient means, such as the construction shown in FIG. 17 to be described hereinafter, the flameholder plate member 96 may be pivoted between the FIG. 3 solid lines, afterburning positions where they cooperate with vanes 94 to form recirculation zone 128 and a retracted nonafterburner position in which they lay flat against or recess into the concave surface 116 of vanes 94 so as to present minimum drag during nonafterburning operation. Flameholder members 96 include a plurality of apertures 148 extending therethrough in a radially extending row or pattern so as to permit the fuel-air mixture to pass therethrough into recirculation zone 125 downstream thereof for ignition and burning in zone 125 to form a pilot combustion zone, and the remainder of the fuel-air mixture passing through passages 110. It will be noted that the hot combustion gases 128 from the pilot 127 flow along the concave side of passage 110 parallel to the flow of the nonvitiated fuel-air mixture and serves to ignite the fuel-air mixture.

In operation, the fuel-air mixture formed by the plurality of fuel spray bars 50 injecting into the passing air, enters passage 110 at inlet section 112 in the downstream direction of flow V. It may be considered that vanes 94 are curved about center of curvature 140 and that due to the swirling motion of the fuel-air mixture about axis 12 as it enters chamber 110 and the subsequent straightening of the flow as it progresses through passage 110, it is evident that the flow is constrained by the vanes 94 to follow a curved path in the plane of FIG. 3. Furthermore, an interface 44 is established in this curved passage between the hot combustion products 128 from the pilot burner 127 and the nonvitiated, cool, fuel-air mixture flowing through the remainder of the passage as shown in FIG. 3. Since the pilot gases are at a considerably higher temperature and have experienced the losses associated with passing through the flameholder holes and combustion, the $\rho V_t^2$ product of these gases is less than that of the nonvitiated flow. As my copending U.S. Patent application filed on even date and entitled "Annular Combustion Chamber for Dissimilar Fluids in Swirling Flow Relationship" fully explains, whenever two fluids flow parallel to a curved interface in such a way that the product parameter $\rho V_t^2$ of the fluid at a smaller radius is greater than the product parameter $\rho V_t^2$ of the fluid on the larger radius side of the interface, where $V_t$ refers to that component of the gas velocity in the tangential direction relative to the center of curvature of the interface, the interface will be unstable and rapid mixing will occur. Such is the case in passage 110 and this product parameter inequality accelerates not only mixing between the cooler fuel-air mixture and the products of combustion but burning of the nonvitiated fuel-air mixture due to this rapid mixing. Even if combustion is not completed in cascade 48 the interdigitated radially extending sheets of hot gas and cooler fuel-air mixture in the duct downstream of vanes 94 will promote completion of the combustion within a short distance downstream of vanes 94. This vitiated mixture is then discharged through outlet portion 114 in the direction of axis 12 as nonswirling flow to be discharged in this fashion to generate thrust through the variable area exhaust nozzle 26.

In the FIG. 3 construction, three fuel spray bars 50 are shown positioned between adjacent vanes 94 and at one of the stations are designated number 1, 2, and 3 for identification. For power control purposes, the fuel spray bars 1, 2, and 3 can be progressively flowed in response to increased engine power requirements. For example, spray bar 1 would be used at all times during low power afterburner opreration and possibly also to maintain pilot combustion zone 128 ignited at all times under circumstances where immediate power increase might be required. In response to demand for increased power, spray bar 2 would be flowed along with spray bar 1 for intermediate afterburner operation, and in response to a demand for maximum power, spray bars 1, 2 and 3 would be flow simultaneously.

Figure 4:
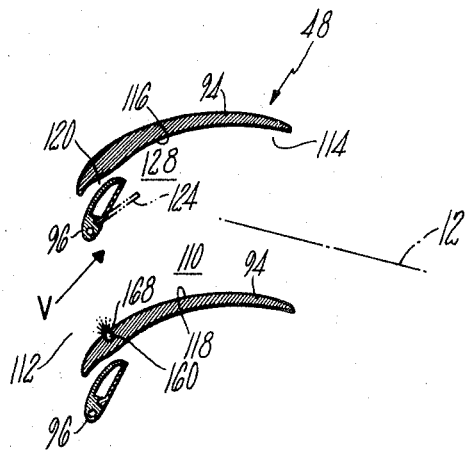
FIG. 4 is a showing similar to FIG. 3 of a modification of my cascade flameholder.

A modification of my cascade flameholder 48 is shown in FIG. 4 wherein vanes 94 form passages 110 as in the FIG. 3 construction. It will be noted that flameholder mechanism 96 is a radially extending member of airfoil cross-section which is located at the inlet portion 112 of passage 110 and is selectively positioned from vanes 94 to form metering slot 120 therebetween through which a selected amount of cooling air is directed against the concave surface 116 of vane 94 for cooling purposes.

Figure 5:
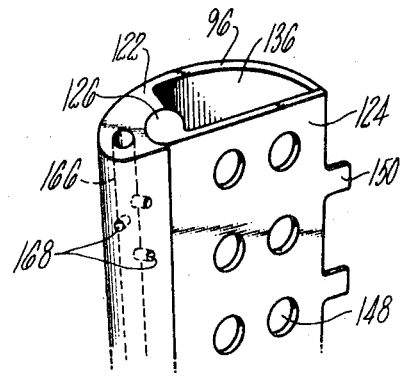
FIG. 5 is an enlarged, perspective showing of the flameholder mechanism used in the FIG. 4 construction.
Figure 6:
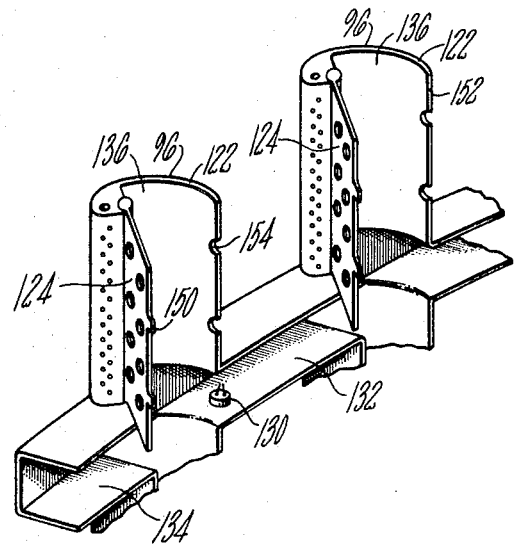
FIG. 6 is a perspective showing of the FIGS. 4-5 flameholder mechanisms in their afterburning positions and connected by a flamespreader.
Figure 17:
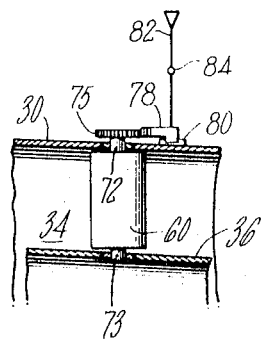
FIG. 17 is an illustration of one of the vane cascades of the FIG. 14 construction shown in variable positionable form.

Flameholder 96 is shown in greater particularity of FIG. 5 and is of generally airfoil cross-section and includes stationary member 122 and pivotable door member 124 pivotally attached thereto along radially extending hinge 126. Door member 124 is pivotable, and may be actuated as shown in FIG. 17, between its FIG. 5 position, which is its nonafterburning position, wherein the door member 124 cooperates with the fixed portion 122 of flameholder member 96 to define a smooth, aerodynamic, low drag shape. As best shown in FIG. 6, door members are pivotable to an open or afterburning position so as to cooperate with fixed portion 122 in defining a void cavity 128 therebetween. Fuel-air mixture enters this cavity through holes 148 in door 124. Conventional ignition means, such as spark plug 130 shown in FIG. 6, can be used to ignite the fuel-air mixture in the pilot combustion zone 128 and it is preferable that flamespreader 132, which is preferably a trough shaped ring, extend circumferentially about axis 12 such that its hollow interior 134 is in communication with the hollow interiors 136 of flameholder 96 so as to assist in initiating combustion and spreading it to the various radial pilot flameholders 96.

While the fuel injection means shown in FIGS. 2 and 3 is a plurality of fuel spray bars, it will be noted by viewing FIG. 4 that the fuel injection means can well be a plurality of radially extending conduits 160 located in the vane forward or upstream portion at convex surface 118 and including a radially extending hole pattern 168 through which fuel is injected for mixing with the air entering passage 110. In addition to these two types of fuel injection, as best shown in FIG. 5, the fuel injection means can be a similar conduit member 166 extending radially through the fixed portion 122 of flameholder 96 and includes an aperture pattern 168 communicating with passage 166 and passage 110 through which atomized fuel is sprayed. The recessed flameholders 160 and 166 have an advantage over spray bars 50, in that they create no drag.

Except for the different flameholder construction, the operation of the cascade flameholder 48 shown in FIGS. 4 and 5 is as previously described in connection with the FIG. 3 construction.

In any of these constructions, it may be desirable to provide trigger means to physically disturb the interface between the swirling, cooler, fuel-air mixture and the swirling, hot products of combustion and trigger means may comprise physical projections 150, shown in FIGS. 5 and 6 extending from the outer periphery of door member 124. To provide a smooth, low-drag, airfoil shape during the nonafterburning mode of operation, indentures 154 may be provided in the trailing edge 152 of stationary portion 122 of flameholder 96 to receive trigger projections 150 in nested relationship.

Figure 7:
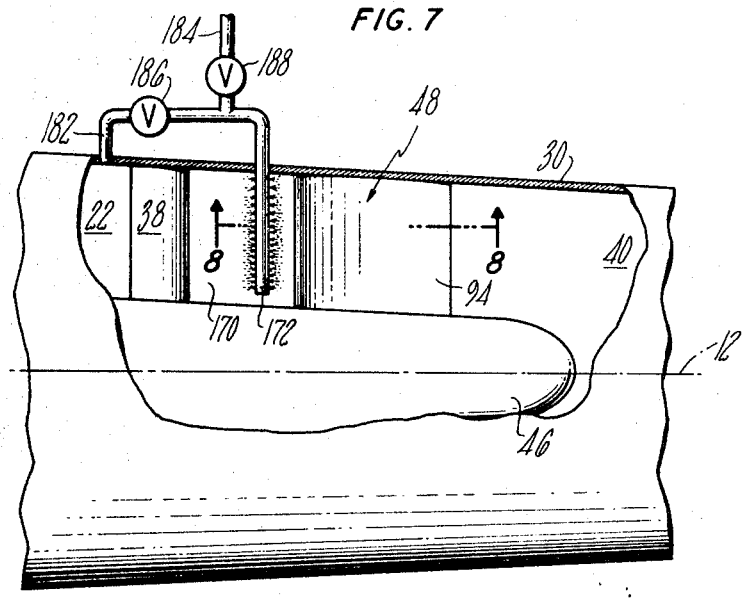
FIG. 7 is a cross-sectional showing of the inlet portion of an afterburner utilizing my combustion chamber defining and flow turning vanes in combination with an aerodynamic flameholder to form a cascade flameholder.
Figure 9:
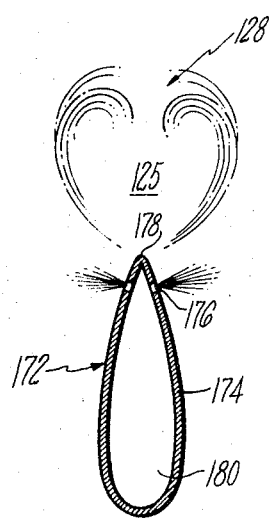
FIG. 9 is an enlarged cross-sectional showing of my aerodynamic flameholder.
Figure 8:
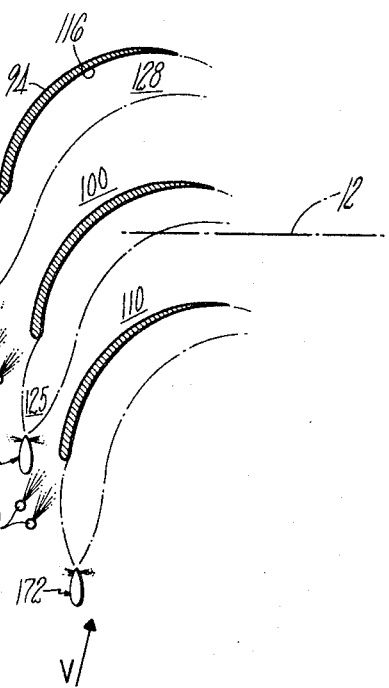
FIG. 8 is a view taken along line 8—8 of FIG. 7.
Figure 10:
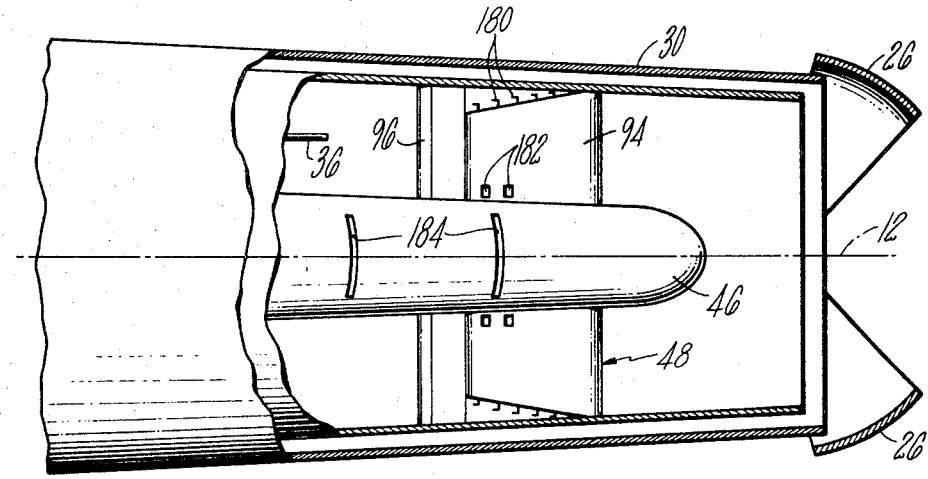
FIG. 10 is a cross-sectional showing of an afterburner utilizing a flameholder and vane construction generally of the type shown in FIG. 2 but wherein the vanes are hollow and have cooling provisions.

Another variation of cascade burning which may be used in my foreshortened afterburner to accelerate combustion is shown in FIGS. 7–9. Preferably, this configuration and the previously described configuration may be used at the very forward end of the afterburner chamber 40 downstream of a diffuser section 170 formed between afterburner duct 30 and tapered inner body 46. The diffuser action serves to reduce the axial component of the swirling flow velocity, $V_x$, but does not retard substantially the tangential flow velocity $V_t$. This aids in supporting combustion and reduces the pressure loss associated with the combustion process. In this modification, straightening vanes 94 are again used as in the FIG. 2–4 constructions to receive the swirling fuel-air mixture approaching in direction V and to straighten the flow thereof to be in alignment with aixs 12. However, a different flameholder and fuel injection provision is included in the FIG. 7–9 embodiment. In this embodiment, the flameholders 172 are of the aerodynamic type and comprise a hollow airfoil shaped tube 174, shown best in FIG. 9, which extends substantially radially with respect to axis 12 and which is interdigitated between adjacent turning vanes 94 so that the wake 128 therefrom flows along concave surface 116 of vanes 94 and passages 110. Aerodynamic flameholders 172 include a pattern of lateral apertures 176 on at least one side, and preferably both sides thereof toward the trailing edge 178 thereof. In this construction, hot air in some form and fuel are injected into the hollow interior 180 of aerodynamic flameholder 172 to be injected substantially laterally thereto through laterally directed slot patterns 176 at sufficient velocity to disturb the flow passing the vane and create a wide recirculation zone 125 downstream of each aerodynamic flameholder to serve as a pilot flame for the fuel-air mixture which is being passed through passages 110 by the injection of fuel in any conventional manner such as the fuel spray bars 50 of the type disclosed in FIG. 2. The warm air for this fuel-air mixture may be tapped through line 182 from upstream of the last turbine stage 22 and fuel is added thereto from a fuel source through line 184 with valves 186 and 188 determining the richness of the fuel-air mixture. This mixture is made excessively rich so that it will not burn until the mixture is diluted by mixing with the flow in the afterburner duct after which it will spontaneously ignite, burn and provide an ignition source for the fuel-air mixture from fuel spray bars 50 entering passages 110. Accordingly, accelerated mixing and burning takes place in combustor passages 100 due to the aforementioned product parameter difference which occurs between the products of combustion and the nonvitiated fuel-air mixture passing through combustor passage 110 in swirl flow relationship. Again, in this construction, an irregular aperture pattern of apertures 176 or selectively positioned indentations or bulges, such as element 150 in FIG. 5, in the trailing edge 178 of aerodynamic flameholder 172 will serve as triggering means to physically disturb the interface between the products of combustion and the nonvitiated fuel-air mixture to further accelerate mixing therebetween.

Figure 11:
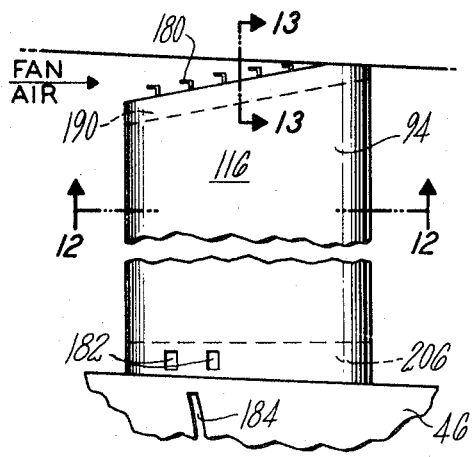
FIG. 11 is an enlarged showing of one of the hollow vanes of the FIG. 10 construction.
Figure 13:
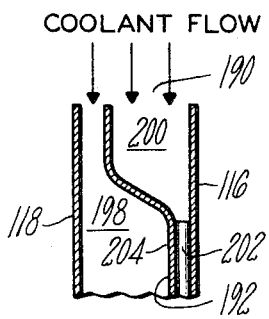
FIG. 13 is a view taken along line 13—13 of FIG. 11.
Figure 12:
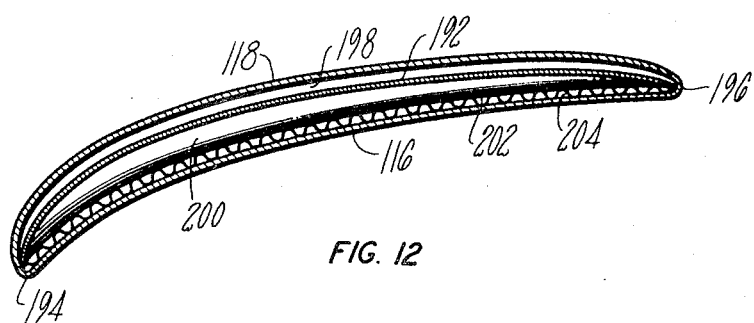
FIG. 12 is a view taken along line 12—12 of FIG. 11.

In certain installations it is important to keep all parts which are exposed to the atmosphere operating at a relatively reduced temperature and this can be accomplished in my turning vane combustor configuration 48 as best shown in the FIG. 10–13 modifications the cooling technique now to be described is important to structural cooling, especially in afterburner installations. As best shown in FIGS. 10–13, vanes 94 are hollow in construction and have flow turning vane cascade 180 at their outer edges which intercept the fan air and further include cooling air discharge slots, such as slot 182 at a low static pressure region closer to centerline 12 and toward the vane upstream stations. In a turbojet installation, cooling air would preferably be ducted to the vanes 90 from the compressor or elsewhere. Centerbody 46 may also be hollow and the interior of vane 94 is in communication with the hollow interior thereof such that coolant discharge may occur through slots 184 in the hollow afterbody 46, preferably as far upstream as possible to achieve maximum pressure differential between the inlet to vanes 94 and the discharge slots. The FIG. 10–13 constructions can be generally of the type shown in connection with FIGS. 3–9 but the details of the vanes 94 are different to accommodate cooling. In this construction, it is desirable that vanes 94 overlap circumferentially. As best shown in FIG. 11, the fan air enters hollow vane 94 through flow turning vane cascade 180 which is positioned to intercept fan air. Upon entering the vane, the cooling air will flow directly to either or both discharge slots 182 and 184 or, if selective cooling is desired as to favor concave surface 116, which is exposed in a downstream location and experiences a higher heat load during augmented operation, the hollow interior of the vane 94 is compartmentized as best shown in FIGS. 11–13. In this compartmentized construction, the fan air, after passing through turning vane cascade 180, enters inlet manifold 190 at the radial outer vane location. Separator member 192 extends between the vane leading edge 194 and the vane trailing edge 196 to separate the flow entering inlet manifold 190 into a first hollow compartment 198 which includes convex wall 118 as one of its boundary defining walls and the remainder of the air from manifold 190 enters second compartment 200 which is of Finwall$_{TM}$ construction.

As best shown in FIG. 13, the inlet manifold 190 is divided by separator 192 so that the bulk of the air entering the vane 94 is directed into Finwall passage 200, while the lesser portion passes through hollow passage 198. The Finwall construction is best shown in FIG. 12 and includes spaced walls 116 and 202 which have radially directed corrugated sheets 204 therebetween. This Finwall construction provides large extended surfaces for the cooling air to scrub against and remove heat from concave wall 116 of the hollow vane to perform a maximum cooling function with respect thereto. After passing through passages 198 and 200, the coolant is then received in discharge manifold 206, which is hollow and runs throughout the full vane axial dimension and is discharged therefrom either through a plurality of slots 182 at an inner radial station in the vanes or enters hollow inner body 46 for discharge therefrom through slots 184, or both. Coolant flow is insured in this fashion since in the swirling flow approaching the vanes the static pressure increases with the distance from axis 12 and therefore slots 182 and 184 are located at minimal static pressure stations while inlet 180 is at a point of maximum static pressure and the radial pressure gradient across the swirling flow provides the pressure differential to flow the cooling system.

While the FIG. 10–13 construction is shown in a turbofan engine environment, it should be borne in mind that hollow, cooling vanes in this cascade flameholder construction could be used in many different kinds of engines. For example, the FIG. 1–13 cascade flameholder could be used in a duct heater within the fan duct of a turbofan engine or in an unmixed turbofan engine where unmixed fan air provides the cooling air. In other engine applications, such as a turbojet engine, the cooling air could be piped to the vane interior from the engine compressor or other convenient presure source.

As best shown in FIG. 1, the configurations of FIGS. 2–13 may be used to form the combustion zone of an afterburner.

In turbofan engines, higher nonaugmented (without afterburning) thrust is achieved when the fan stream and the engine exhaust gas stream are mixed and discharged through a common exhaust nozzle to generate thrust. To reduce the overall engine length and weight, it is desirable to reduce the afterburner length by accelerating this mixing. Mixing acceleration can be achieved by the use of concentric or barberpole mixers now to be described. These mixers not only reduce afterburner length and weight but are well suited for use with the previously described cascade burner 48 because the exit flow therefrom is swirling and swirling inlet flow is a requirement of the cascade flameholder.

Figure 15:
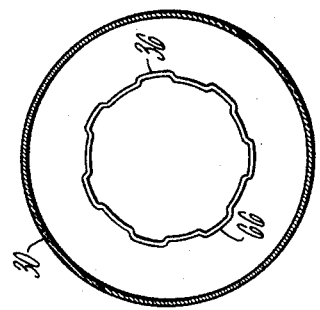
FIG. 15 is a view taken along line 15—15 of FIG. 2 and showing radially extending corrugations as trigger means on the splitter duct.
Figure 14:
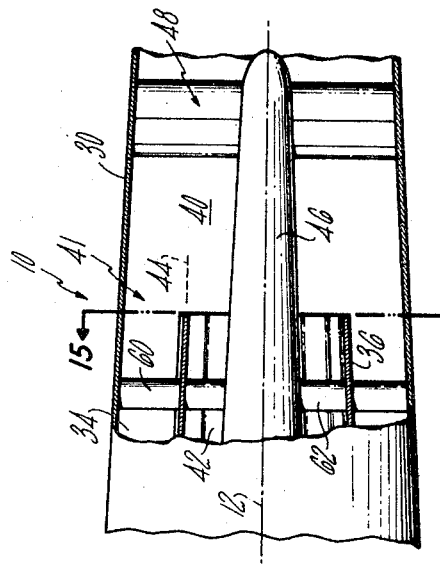
FIG. 14 is a cross-sectional showing of an afterburner with a central portion thereof removed to illustrate the use of the fan air duct and the splitter duct as concentric mixers along or with a cascade flameholder.
Figure 16:
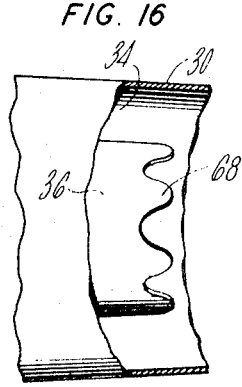
FIG. 16 is an alternate form of trigger means and is illustrated as axially extending scallops at the trailing end of the splitter duct.

A concentric mixer used in this environment is shown in FIGS. 14–16 and it should be noted that the mixer is located upstream of the previously described cascade flameholder 48.

Referring to FIG. 14 we see that fan air enters afterburner chamber 40 through annular passage 34 and the engine gases enter the afterburner chamber 40 through annular passage 42 to establish interface 44 therebetween. Both of these streams may be swirling about axis 12 without further assistance, or by removal of the flow vanes which are conventionally located downstream of the fan and turbine, however, it may be desirable to place a cascade of turning vanes 60 in passage 34 and a cascade of turning vanes 62 in passage 36 to establish the desired tangential velocities, $V_t$, of the swirling streams to accelerate mixing between the engine exhaust gases and the fan air by establishing the mixing criteria product parameter ratio $\rho_1 V_{t1}^2 > \rho_2 V_{t2}^2$, where $\rho_1$ and $V_{t1}$ are the density and tangential velocity of the engine exhaust gas, respectively, and $\rho_2$ and $V_{t2}$ are the desntiy and tangential velocity of the fan air, respectively. The theory of swirling flow intermixing is explained in detail in my copending application filed on even date and entitled "Annular Combustion Chamber for Dissimilar Fluids in Swirling Flow Relationship", to which reference may be made. With this product parameter ratio established, interface 44 is unstable and intermixing between the engine exhaust gas and the fan air is accelerated. To further accelerate this intermixing, radially extending corrugations 66 may be positioned in the splitter duct 36 at its downstream end. These convolutions physically disturb the unstable interface 44 to further accelerate the rate of intermixing between the engine exhaust gas and the fan air. So as to hold flow loses to a minimum while accomplishing the desired perturbation of the interface, it is important that convolutions 66 extend over about 20 percent to 30 percent of the fan air and engine gas streams.

In addition to, or as a substitute for, the radially extending corrugations shown in FIG. 15, splitter duct 36 could be fabricated to include axially extending scallops 68 shown in FIG. 16 which will serve to physically disturb the unstable interface 44. Because it is desirable to cause the exhaust gases to be discharged to atmosphere through exhaust nozzle 26 in an axial flow direction, it may be desirable to place a cascade of straightening vanes 70 in the afterburner chamber 40 upstream of the exhaust nozzle. Obviously, these vanes could be the previously discussed flameholder vanes.

While the vanes of cascades 60 and 62 may be selectively shaped and oriented and fixed in position, it may be desirable to make one or both of them of the variable position type as shown in FIG. 17. In the FIG. 17 construction, vane 60 is pivotally connected to afterburner duct 30 and splitter duct 36 by pivot pin members 72 and 73 which extends from opposite ends thereof. Each vane 60 carries ring gear 75 at its outer end. Annular ring gear 78 is supported for rotation about axis 12 by support ring 80 and has matching gears matingly engaging the gears of each of the ring gears 75 so that as annular gear 78 is caused to rotate about axis 12 by pilot manipulation in any convenient way, such as pilot controlled linkage 82 which connects pivotally to annular gear 78 and is pivotally supported about pivot point 84, each of the ring gears 75 and hence vanes 60 are caused to pivot about their axis in unison to a new position so as to vary the flow angle and hence the tangential velocity $V_t$ of the fluid flowing between the vanes.

Figure 20:
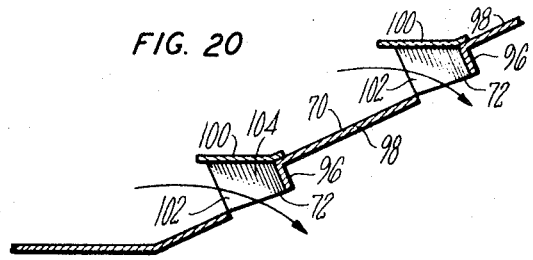
FIG. 20 is an alternate form of the tapered separator duct and the vaned cascade and slot combination of the barberpole mixer.
Figure 18:
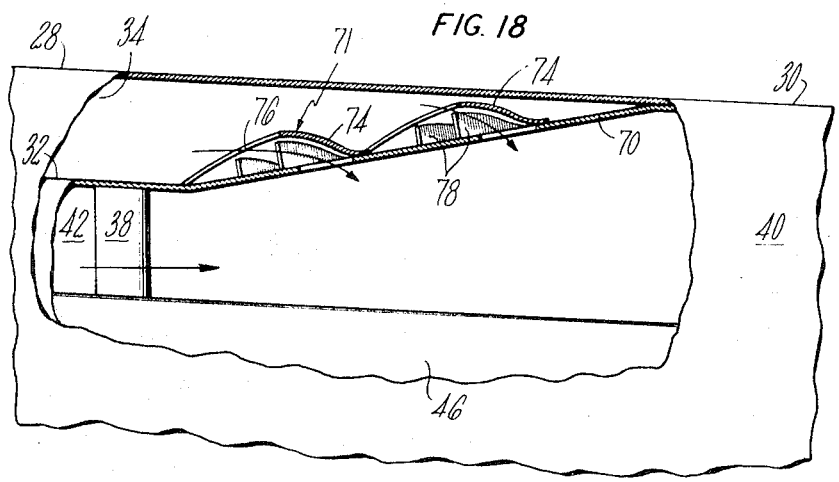
FIG. 18 is a partial showing of the afterburner inlet utilizing a "barberpole" mixer.
Figure 19:
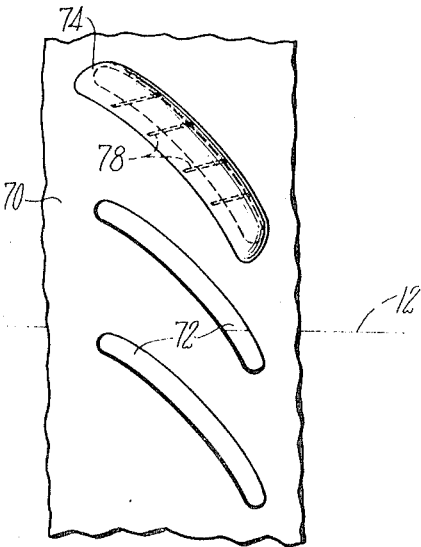
FIG. 19 is an unrolled showing of the tapered separator duct which extends across the fan-air passage to illustrate the helical slot plurality used therein and to illustrate also the three-dimensional hooded, vaned cascade used with these slots.

Another modification of the accelerated intermixing feature of my afterburner is shown in FIGS. 18 and 20. As best shown in FIG. 18, conical separator duct 70 is connected at its forward end to engine case 32 and increases in radial dimension from axis 12 in a downstream direction and attaches at its downstream end to fan case 28 so as to extend completely across the fan air passage 34. FIG. 19 shows conical separator member 70 in an unrolled condition and it will be noted that it includes a circumferentially extending row of slots 72, which slots are helically oriented with respect to axis 12 and of selective spacing and numbering that the total area defined by the slot plurality through which the fan air must pass is matched to the cross-sectional area of annular passage 42 downstream of turbine stage 38 through which the engine exhaust gases must pass so as to establish a selected velocity magnitude V at which the fan air enters the afterburner chamber 40 through slots 72. Three-dimensional scooped cascades 74 extend from each slot and include hood member 76 which connects to separator 70 at its after end and is open at its forward end to intercept fan air, and which further includes a cascade of turning vanes such as 78 which cooperate with hood member 76 in intercepting the fan air from passage 34 and cause the fan air to turn in direction smoothly into the afterburner chamber 40 through slots 72 at a selected tangential velocity $V_t$. This construction is known as barberpole mixer 71 in that swirling helical sheets of fan air are caused to penetrate into the swirling engine exhaust gases due to the action of the three dimensional vaned cascades and slots 72 to establish interdigitated streams of dissimilar fluids for accelerated mixing therebetween. The connecting of vaned cascades 74 and slots 72 is selected so as to establish the mixing criteria product parameter ratio $\rho V_t^2$ (engine exhaust gases)$> V_t^2$ (fan air) where $\rho$ is fluid density and $V_t$ is fluid tangential velocity.

For ease of construction, it may be desirable to fabricate separator 70 as shown in FIG. 20 so that it includes stepped forward ends 96 in wall members 98, which cooperate with hood members 100 to intercept and direct the flow of fan air into the afterburner with the cooperation of the cascade of vanes 102. In the FIG. 20 construction, the vanes are attached by welding or other convenient means to the stepped front end 96 of the wall members 98 and to hood member 100 to form the selectively shaped passage 104 therethrough to determine the tangential velocity $V_t$ at which the fan air is going to enter the helically directed, spaced slots 72. As such, FIG. 20 represents a barberpole mixer modification which may be simpler to fabricate.

It will be noted that in both the concentric mixer configuration shown in FIGS. 14-16 and in the barberpole mixer configuration shown in FIGS. 18 and 19 a swirling flow situation is created within the afterburner passage 40 and this swirling flow condition is a requirement for the inlet flow of the cascade flameholder 48 previously described in connection with FIGS. 2-13. Accordingly, as best shown in FIG. 14, it is highly desirable to utilize either of these mixers upstream of cascade flameholder 48 to accomplish overall afterburner length reduction.

While I have illustrated and described my cascade flameholder 48 in an afterburner environment as shown in FIGS. 2-13, it is important to note that it has serveral additional applications. For example, in the turbofan engine illustrated, the cascade flameholder 48 is shown to be used in the mixed-flow afterburner, but it could also be used as a duct heater by being selectively positioned in passage 34. My cascade flameholder could also be used in the main combustion chamber or the afterburner of a turbojet engine, or could, in fact, be used as an interburner between turbine stages, or in any other environment which defines an annular passage in which a change in the flow directions is desirable. The vanes of my cascade flameholder act as straightening vanes in both the burning and non-burning modes of operation and also serve as combustion flameholders.

It will be evident to those skilled in the art that an afterburner of my construction is foreshortened by the use of either the concentric mixer or the barberpole mixer with the vane cascade combustors taught herein and an advantage to a lesser degree will also be achieved by using the mixers or the vane combustors by themselves.

I wish it to be understood that I do not desire to be limited to the exact details of construction shown and described, for obvious modifications will occur to a person skilled in the art.

I claim:

1. A turbine-fan engine having an axis, an afterburner at the downstream end of the turbine engine enveloped within a duct of substantially circular cross-section supported concentrically about said axis, a splitter duct enveloped within said afterburner duct and being of substantially circular cross-section and concentric therewith so as to cooperate with said after burner duct in defining an annular passage therebetween and so as to define a second passage therewithin, means to pass a first swirling stream of turbine discharge fluid of density $\rho_1$ and tangential velocity $V_{t1}$ through said second passage into said afterburner to establish a product parameter $\rho_1 V_{t1}^2$, means to pass a second swirling fluid stream of fan air through said annular passage into said afterburner to establish an interface between said swirling fluids and with the second fluid being of density $\rho_2$ and tangential velocity $V_{t2}$ to establish a product parameter $\rho_2 V_{t2}^2$ which is less than the product parameter $\rho_1 V_{t1}^2$.

2. Apparatus according to claim 1 and including trigger means located at the downstream end of said splitter duct to physically disturb the interface between the two swirling fluid streams.

3. Apparatus according to claim 2 and including at least one cascade of flow guide vanes positioned circumferentially about each of said annular duct passage and said second passage and oriented so as to selectively influence the tangential velocity $V_t$ of the fluid passing therethrough.

4. Apparatus according to claim 3 wherein at least some of said guide vane cascades is variable in position and area.

5. Apparatus according to claim 3 and including a variable area exhaust nozzle located at the downstream end of said afterburner duct, and flow straightening vanes extending across the afterburner duct upstream of the exhaust nozzle and selectively oriented and shaped to remove swirl from the fluid passing therebetween so that nonswirling fluid is discharged to atmospheres through said exhaust nozzle.

6. Apparatus according to claim 2 wherein said trigger means comprises radially extending corrugations extending circumferentially about the downstream end of said splitter duct.

7. Apparatus according to claim 6 wherein said corrugations extend radially across about 20 percent to 30 percent of the first and second fluid streams.

8. Apparatus according to claim 2 wherein said trigger means are axially extending scallops positioned on the downstream end of the splitter duct.

9. Apparatus according to claim 2 wherein said trigger means are radially extending convolutions and axially extending scallops located on the downstream end of the splitter duct.

10. Apparatus according to claim 1 wherein said second fluid is non-swirling and has a tangential velocity $V_t$ of zero.

11. A turbofan engine having an axis and including:
A. an afterburner into which turbine exhaust gas and fan air are discharged,
B. an inner duct concentric about said axis and enveloping the turbine to define a first passage through which turbine air flows, and with the first passage being of selected cross-sectional area to determine the amount of turbine air going into the afterburner,
C. a second duct concentrically enveloping said first duct and cooperating therewith to define the fan-air passage therebetween,
D. an afterburner casing positioned downstream of said ducts to define an afterburner chamber therewithin and connected to said second duct,
E. a conical separator duct extending between said first and second ducts and having an upstream end connected to said first duct and a downstream end connected to said second duct, and having:
 1. a plurality of slots located circumferentially thereabout and each disposed helically with respect to said axis and of selected number, size and spacing to define the total area through which fan air may pass into said afterburner chamber and with said total area of the slots selected with respect to the cross-sectional area of the first passage to establish the velocity at which fan air enters the afterburner chamber,
 2. a scoop member enveloping each slot and selectively shaped to intercept fan air and direct the fan air through the slot and into the afterburner chamber in a selected direction to achieve a selected tangential velocity $V_t$ so as to establish spaced, helically swirling sheets of fan air penetrating into the swirling turbine air to accomplish rapid intermixing thereof in a minimal axial distance.

12. A turbofan engine having an axis and including:
A. an afterburner into which turbine exhaust gas and fan air are discharged,
B. an inner duct concentric about said axis and enveloping the turbine to define a first passage through which turbine air flows and with the first passage being of selected cross-sectional area to determine the amount of turbine air going into the afterburner,
C. means to pass swirling fluid through said turbine at density $\rho_1$ and tangential velocity $V_{t1}$,
D. a second duct concentrically enveloping said first duct and cooperating therewith to define the fan-air passage therebetween,
E. an afterburner casing positioned downstream of said ducts to define an afterburner chamber therewithin and connected to said second
F. a conical separator duct extending between said first and second ducts and having an upstream end connected to said first duct and a downstream end connected to said second duct, and having:
 1. a plurality of slots located circumferentially thereabout and each disposed helically with respect to said axis and of selected number, size and spacing to define the total area through which fan air may pass into said afterburner chamber and with said total area of the slots selected with respect to the cross-sectional area of the first passage to establish the velocity at which fan air enters the afterburner chamber,
 2. a scoop member enveloping each slot and selectively shaped to intercept fan air and direct the fan air through the slot and into the afterburner chamber in a selected direction to achieve a selected tangential velocity $V_{t2}$ so as to establish spaced, helically swirling sheets of fan air penetrating into the swirling turbine air to accomplish rapid intermixing thereof in a minimal axial distance,
G. and means to pass fan air of density $\rho_2$ through said scoop members and slots at selected tangential velocity $V_{t2}$ so that $\rho_1 V_{t1} > \rho_2 V_{t2}$.

13. Apparatus according to claim 12 and including a plurality of selectively shaped and oriented flow turning vanes located in said scoop members.

14. A turbofan engine having an axis and including:
A. an afterburner into which turbine exhaust gas and fan air are discharged,
B. an inner duct concentric about said axis and enveloping the turbine to define a first passage through which turbine air flows and with the first passage being of selected cross-section area to determine the amount of turbine air going into the afterburner,
C. a second duct concentrically enveloping said first duct and cooperating therewith to define the fan-air passage therebetween,
D. an afterburner casing positioned downstream of said ducts to define an afterburner chamber therewithin and connected to said second duct,
E. a conical separator duct extending between said first and second ducts and having an upstream end connected to said first duct and a downstream end connected to said second duct, and having:
 1. a plurality of slots located circumferentially thereabout and each disposed helically with respect to said axis and of selected number, size and spacing to define the total area through which fan air may pass into said afterburner chamber and with said total area of the slots selected with respect to the cross-sectional area of the first passage to establish the velocity at which fan air enters the afterburner chamber, 2. a three-dimensional scoop cascade enveloping each slot and comprising a hood member with flow turning vanes therein and selectively shaped to intercept fan air and direct the fan air through the slot and into the afterburner chamber in a selected direction to achieve a tangential velocity $V_{t2}$ so as to establish spaced, helically swirling sheets of fan air penetrating into the swirling turbine air to accomplish rapid intermixing thereof in a minimal axial distance.

15. A turbofan engine having an axis and including:
A. an afterburner into which turbine exhaust gas and fan air are discharged,
B. an inner duct concentric about said axis and enveloping the turbine to define a first passage through which turbine air flows and with the first passage being of selected cross-sectional area to determine the amount of turbine air going into the afterburner,
C. a second duct concentrically enveloping said first duct and cooperating therewith to define the fan-air passage therebetween,
D. an afterburner casing position downstream of said ducts to define an afterburner chamber therewithin and connected to said second duct,
E. a conical separator duct extending between said first and second ducts and having an upstream end connected to said first duct and a downstream end connected to said second duct, and having:
   1. a plurality of wall members shaped to define a plurality of slots located circumferentially thereabout and each disposed helically with respect to said axis and of selected number, size and spacing to define the total area through which fan air may pass into said afterburner chamber and with said total area of the slots selected with respect to the cross-sectional area of the first passage to establish the velocity at which fan air enters the afterburner chamber and with at least some of said wall members having stepped forward ends,
   2. a scoop member connected to and projecting forward from said stepped forward end and extending over each slot,
   3. a plurality of flow turning vanes located in each of said slots and extending outwardly therefrom, and connected to said wall member stepped forward end and said scoop member shaped to intercept fan air and direct the fan air through the slot and into the afterburner chamber in a selected dimension to achieve a selected tangential velocity $V_{t2}$,
   4. said scoop members, vanes and wall members being selectively shaped and positioned so as to establish spaced, helically swirling sheets of fan air penetrating into the swirling turbine air to accomplish rapid intermixing thereof in a minimal axial distance.

16. A turbofan engine having an afterburner and being concentric about an axis and including: a fan-air duct concentric about said axis, an afterburner casing located downstream of said fan-air duct and concentric about said axis and connected thereto and inner duct concentric about said axis and developing said engine and cooperating with said fan-air duct to define an annular fan-air passage and defining an engine exhaust gas passage therewithin so that the engine exhaust gases enter the afterburner therethrough, and inner body extending into said afterburner downstream of said engine and being of hollow construction, a plurality of vanes extending between said afterburner casing and said inner body and wherein said vanes are of substantially hollow construction and have an open radially outer end which is of minimal radial distance from the axis at the vane leading edge and maximum radial distance from the axis at the vane trailing edge and including:
A. means to cool said vanes including:
   1. means to pass fan-air along the outer periphery of said afterburner chamber at a location to be intercepted by the hollow ends of said vanes,
   2. a plurality of flow turning vanes positioned across the open outer ends of each of said hollow vanes and shaped to define passages therebetween which intercept said fan-air and change the direction of flow thereof into the hollow interior of said vanes,
   3. means to discharge said fan-air flow into said afterburner chamber at a station of lesser radius than the vane open outer end.

17. Apparatus according to claim 16 and wherein said vanes overlap circumferentially.

18. Apparatus according to claim 17 where said hollow vanes have a concave wall and a convex wall and with said concave wall facing generally in a downstream direction and wherein each vane also has:
A. a coolant inflow manifold extending across the opened outer end of said vane to collect all fan-air flow entering said vane,
B. a fan-air outlet manifold located at a blade inner radial station,
C. a separator member attached to the interior of the blade leading edge and the interior of the blade trailing edge and extending therebetween and between the fan-air inlet manifold and the fan air outlet manifold to divide the interior of the blade into two parallel, radially directed passages, and wherein said separator member is located closer to said convex wall than said concave wall at the coolant inlet manifold and wherein the first of said parallel coolant passages is a hollow passage extending between the fan air inlet and outlet manifold and with the separator member and the vane convex wall defining the boundaries thereof, and further wherein said second parallel fan air passage extends between said fan air inlet and outlet manifolds and is defined between said blade concave wall and said separator means which define closely spaced wall and having:
   1. a corrugated member extending between said concave wall and said separator means with the corrugations thereof extending substantially in a radial direction so as to cause the coolant flow to scrub against said concave wall,
D. a plurality of said discharge slots located in said coolant outlet manifold to discharge said coolant into said afterburner chamber.

19. A turbofan engine having an axis and including:
A. an afterburner into which turbine exhaust gas and fan-air are discharged,
B. an inner duct concentric about said axis and enveloping the turbine to define a first passage through which turbine air flows, and with the first passage being of selected cross-sectional area to determine the amount of turbine air going into the afterburner, C. a second duct concentrically enveloping said first duct and cooperating therewith to define the fan-air passage therebetween, D. an afterburner casing positioned downstream of said ducts to define an afterburner chamber therewithin and connected to said second duct, E. a conical separator duct extending between said first and second ducts and having an upstream end connected to said downstream end connected to said second duct, and having:
1. a plurality of slots located circumferentially thereabout and each disposed helically with respect to said axis and of selected number, size and spacing to define the total area through which fan air may pass into said afterburner chamber and with said total area of the slots selected with respect to the cross-sectional area of the first passage to establish the velocity at which fan air enters the afterburner chamber,
2. a scoop member enveloping each slot and selectively shaped to intercept fan air and direct the fan air through the slot and into the afterburner chamber in a selected direction to achieve a selected tangential velocity $V_t$ so as to establish spaced, helically swirling sheets of fan air penetrating into the swirling turbine air to accompoish rapid intermixing thereof in a minimal axial distance, F. an annular combustion chamber located within said afterburner casing downstream of said splitter duct and positioned to receive a mixture of fan air and turbine exhaust gases in a swirling flow pattern and including:
1. a centerbody positioned concentrically within said afterburner casing to define an annular combustion chamber therebetween,
2. a cascade of radially extending, airfoil shaped vanes positioned concentrically about said axis within said annular chamber with the vanes shaped so that adjacent vanes define a passage therebetween which has an upstream portion which defines a passage which is in substantial alignment with the direction of fluid flow passing through the afterburner chamber and which has a downstream portion which defines a passage substantially in alignment with the axis so that the vanes serve as straightening vanes for the fluid flowing therebetween, and so that the concave side and convex side of adjacent vanes form the concave and convex walls of said passage, respectively, and with the vanes being shaped so that said concave and convex walls of each passage are positioned substantially about a common center of curvature,
3. a flameholder member positioned and shaped to establish a stagnation zone downstream thereof in said passage adjacent said concave wall,
4. means to pass fuel into said passage to form a swirling fuel-fluid mixture passing over said flameholder, and
5. means to ignite said fuel-fluid mixture to establish combustion in said zone within said passage adjacent said concave wall to establish outside-inside burning within said passage progressing in the direction from the concave wall to the convex wall.

20. A turbine fan engine having an axis,
A. an afterburner at the downstream end of the turbine engine enveloped within a duct of substantially circular cross-section supported concentrically about said axis,
B. a splitter duct enveloped within said afterburner duct and being of substantially circular cross-section and concentric therewith so as to cooperate with said afterburner duct in defining an annular passage therebetween and so as to define a second passage therewithin,
C. means to pass first swirling stream of turbine discharge fluid of density $\rho_1$ and tangential velocity $V_{t1}$ through said second passage into said afterburner to etablish a product parameter $\rho_1 V_{t1}^2$,
D. means to pass a second swirling fluid stream of fan air through said annular passage into said afterburner to establish an interface between said swirling fluids and with the second fluid being of density $\rho_2$ and tangential velocity $V_{t2}$ to establish a product parameter $\rho_2 V_{t2}^2$ which is less than the product parameter $\rho_1 V_{t1}^2$,
E. an annular combustion chamber located in said afterburner downstream of said splitter duct to receive a swirling mixture of said first and second fluids and including:
1. a duct member positioned within the afterburner casing and cooperating therewith to define an annular chamber therebetween,
2. a cascade of radially extending, airfoil shaped vanes positioned concentrically about said axis within said annular chamber with the vanes shaped so that adjacent vanes define a passage therebetween which has an upstream portion which defines a passage which is in substantial alignment with the direction of fluid flow passing through the annular chamber and which has a downstream portion which defines a passage substantially in alignment with the axis so that the vanes serve as straightening vanes for tee fluid flowing therebetween, and so that the concave side and convex side of adjacent vanes form the concave and convex walls of said passage, respectively, and with the vanes being shaped so that said concave and convex walls are positioned substantially about a common center of curvature,
3. a flameholder member positioned and shaped to establish a stagnation zone downstream thereof in said passage adjacent said concave wall,
4. means to pass fuel into said passage to form a swirling fuel-fluid mixture passing over said flameholder,
5. means to ignite said fuel-fluid mixture to establish combustion in said zone within said passage adjacent said concave wall to establish outside-inside burning with said passage progressing in the direction from the concave wall to the convex wall.

* * * * *